United States Patent [19] [11] 3,761,134
Hurd [45] Sept. 25, 1973

[54] ARTICLE DECELERATOR FOR AIR CONVEYOR

[75] Inventor: Stanley E. Hurd, Sunnyvale, Calif.

[73] Assignee: The Motch & Merryweather Machinery Company, Euclid, Ohio

[22] Filed: Jan. 6, 1972

[21] Appl. No.: 215,882

Related U.S. Application Data

[63] Continuation-in-part of Ser. No. 7,090, Jan. 30, 1970, abandoned.

[52] U.S. Cl. .................................................. 302/31
[51] Int. Cl. .......................................... B65g 51/02
[58] Field of Search ............ 65/25, 91, 163, 182 A; 193/32, 35 A, 40; 214/1 BE; 302/2 R, 29, 31

[56] References Cited
UNITED STATES PATENTS

| | | | |
|---|---|---|---|
| 499,075 | 6/1893 | Winn | 193/40 X |
| 2,306,955 | 12/1942 | Karbusky | 193/32 X |
| 2,778,691 | 1/1957 | Hazel | 302/31 X |
| 2,505,963 | 5/1950 | Hedenskoog | 193/40 X |
| 2,949,302 | 8/1960 | Place | 193/32 X |
| 715,560 | 12/1902 | Dedrick | 193/32 X |

Primary Examiner—Evon C. Blunk
Assistant Examiner—W. Scott Carson
Attorney—Patrick J. Walsh

[57] ABSTRACT

A momentum decelerator for air conveyors having the preferred form of a rotatable turnstile positioned above the conveyor with a downwardly directed arm in the path of oncoming articles. The turnstile is rotated upon impact of the downward arm with the moving article to be slowed down and this rotation results in a second arm applying a decelerating force to the article in proportion to the momentum of impact. The decelerator distinguishes between a single article traveling along the conveyor and an accumulated group of articles, and operates only on the first member of a group, allowing the others of the group to pass without further restraint so as to prevent stopping of grouped articles on the conveyor.

2 Claims, 4 Drawing Figures

PATENTED SEP 25 1973                                    3,761,134

ARTICLE DECELERATOR FOR AIR CONVEYOR

This is a Copntinuation in Part of Ser. No. 7,090 filed Jan. 30, 1970 now abandoned.

BACKGROUND OF THE INVENTION AND PRIOR ART

One of the difficulties associated with the transporting of breakable articles by air conveyors is maintaining and controlling their speed. If the air pressure produced is too low, an insufficient force will not propel an accumulated group of articles, nor will it restart the movement of such articles should they become stopped at some point along the conveyor. On the other hand, if the air pressure is increased sufficiently to propel an accumulated group of articles or to restart stopped articles, the continuing application of such force to a single article will eventually accelerate the article, if the conveyor is long, to progressively increasing its speed to the point of where impact of such article with another article or other obstacle will result in forces that may be sufficient to break, rupture, or otherwise damage the article.

Various efforts have been made have been made to regulate and control the speed of such conveyed articles. One attempted solution is to adjustably regulate the pressure in the air plenum at different downstream sections by using regulating valves, changing the number or arrangement of the slots, or by other techniques to regulate the air forces. However, it is quite difficult to so adjust the air pressure and flow at different sections of the conveyor so as to always provide sufficient pressure for starting and conveying accumulated loads and yet not producing such excessive pressure as to unduly accelerate individual articles. Additionally, such air regulation systems have been found to increase the complexity and cost of the conveyor system beyond that which is considered desirable.

An alternative proposed solution is to provide a constant drag or constantly acting retarding force on the air conveyed articles. However, such constant drag force does not distinguish between articles traveling alone and those moving in an accumulated group. Therefore, if the constant drag is sufficient to properly slow down an article traveling alone, it will entirely stop an accumulated group of articles and prevent proper feeding of such articles by the conveyor.

STATEMENT OF THE INVENTION

The present invention provides a comparatively inexpensive solution to the problem of preventing articles from being conveyed at excessive speeds yet providing sufficient air forces to restart stopped articles and to propel acumulated groups of articles. This is performed by spacing a series of article decelerators at downstream distances along the length of the conveyor, each of which intermittantly engages the moving articles as they pass by and provides a sufficient decelerating force to the engaged article to regulate and maintain a proper speed.

Each such decelerator is essentially a passive force redirecting mechanism that is struck or impacted by the moving article as it passes by and functions to apply a variable force against the articles sufficient to decelerate the article. The force applied to the article is in proportion to its momentum of impact with the decelerator and therefore the article is slowed down only in proportion to its speed when stiking the decelerator.

The decelerator also uniquely functions to apply the force to only the first one of an accumulated group of articles and permits the remaining articles in the group to pass by without further interference. This insures that an accumulated group of end-to-end articles will not be stalled to an extent that is beyond the ability of the conveyor to restart.

DESCRIPTION OF THE DRAWINGS

Referring to FIG. 1, the air conveyor 10 is of the general construction such as shown in earlier U.S. Pat. No. 3,131,974 including a suitable sheet metal conduit 10 having a flat upper surface or bed with one or more rows of inclined openings 11 spaced apart lengthwise or downstream along the conveyor. As best shown in FIGS. 1a and 1b, the air jets 12 emerging from the inclined openings 11 have a component directed upwardly to suspend or lift the articles 13 to be conveyed and a second component directed parallel to the surface of the bed to propel the suspended articles.

Figure 1:
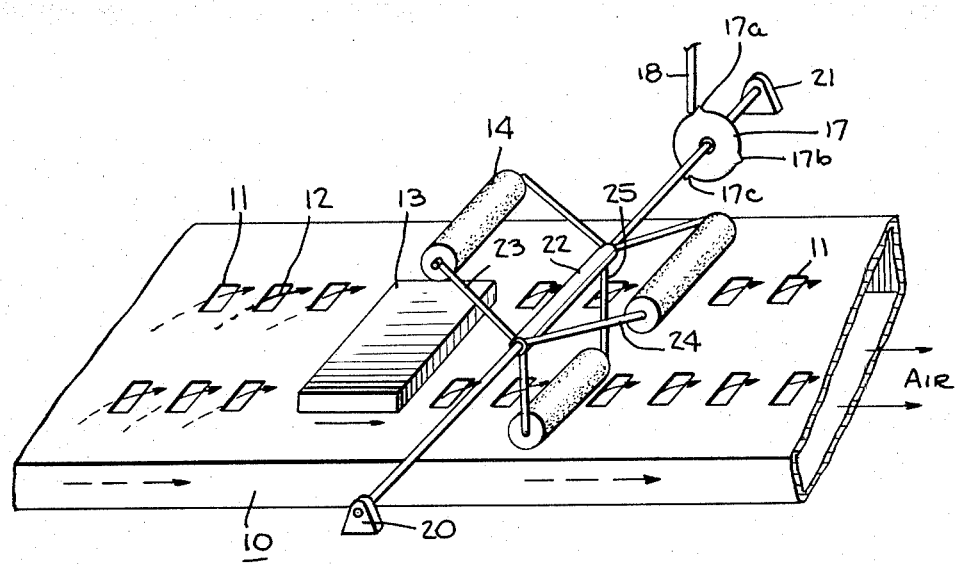
FIG. 1 is a perspective view schematically illustrating an air conveyor and one preferred turnstile type decelerator according to the invention.

It will be appreciated that even a constant component of propelling air force acting on the articles 13 will accelerate the articles, and if the conveyor is sufficiently long this force will soon increase their speed beyond that desired. For periodically decelerating the articles, a plurality of turnstile type decelerators are spaced apart at suitable intervals downstream above the conveyor bed. Each decelerator is provided with at least two angularly displaced and interconnected arms such as 23 and 25 that are together pivotable about an axis along shaft 22, arranged transversely to the direction of the air flow from the conveyor.

In the preferred construction shown in the drawings, each decelerator is provided with three angularly displaced U-shaped arms 22, 24, 25 in a turnstile or star shaped configuration attached to the central shaft 22. The shaft 22 is suitably supported to pivot or rotate in bearing supports 20 and 22, permitting the arms to pivot about the axis of the shaft 22. A toothed wheel or ratchet 17 is provided on the shaft 22 and its teeth are engaged by a flexible spring blade 18, the engagement of blade 18 with the ratchet forming a resilient stop to prevent the turnstile from freely rotating about the axis of shaft 22.

Figure 1A:
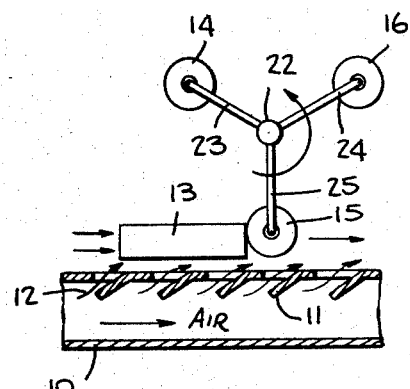
FIG. 1a and 1b are side views schematically illustrating the force redirecting mode-of-operation of the decelerator of FIG. 1.

In the absence of this temporary stop, the horizontal component of air flow from the conveyor, acting upon the legs of the turnstile, would spin the turnstile about the axis of shaft 22. However, the spring blade 18 and toothed wheel 17 provide a sufficient restraining force to normally maintain the turnstile in the stationary position of figures 1 and 1a. The teeth 17a, b, c on the ratchet wheel 17 are so arranged in phase relationship to the angular location of the legs that the turnstile is normally pivoted by the air flow until one of the legs 23, 24 or 25 is positioned downwardly, as shown in FIG. 1 and FIG. 1a, disposed in the path to intercept oncoming articles 13 traveling along the conveyor. As shown in FIG. 1 the preferred arrangement of teeth of 17a,b, and c on the ratchet wheel is to locate teeth 17a,b, and c such that spring blade 18 will engage tooth 17a to stop the turnstile with cushioned roller 15 positioned in the path to intercept oncoming articles. Similarly, teeth 17b and 17c are effective to position cushioned rollers 14 and 16 respectively in the path of oncoming articles when spring blade 18 engages such ratchet teeth 17b and 17c. By this arrangement the turnstile has a tendency to rotate under the influence of the air flow along the conveyor surface until one of the legs is positioned to intercept oncoming articles. At the base of each of the U-shaped legs is provided a cushioned roller, 14, 15 and 16 that may be of foam rubber or the like whose purpose is to cushion the impact between the articles 13 being conveyed and the decelerator.

Figure 1B:
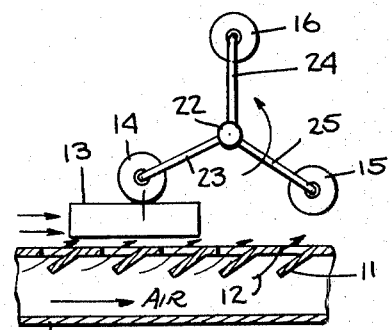

In operation, as generally illustrated in FIGS. 1a and 1b, the forward or leading side of articles 13 traveling the conveyor collide with the downwardly directed leg 25 of the decelerator, striking the cushioned roller 15 provided about this leg 25. The momentum of impact involved is proportional to the weight and to the speed of travel of articles 13, and this impact rapidly pivots the turnstile in a counterclockwise direction, as shown by the arrowed line. Rotation of the turnstile, brings the next arm 23 of the turnstile downwardly, and the cushioned roller 14 about this arm strikes the top surface of the article 13 with substntially the same momentum as provided by the initial collision, all as illustrated in FIG. 1a. This impact momentarily pushes the articles downwardly against the conveyor bed, slowing its speed as desired.

It will be noted that the decelerating force or momentum is in proportion to the speed of the article 13, since the turnstile merely operates to redirect this force backwardly onto the article 13. Consequently, the faster the article 13 is traveling, the greater will be the decelerating force to slow down the article.

After the second arm 23 of the turnstile strikes the top surface of the article 13, its energy is substantially dissipated and the two legs 23 and 25 remain in the displaced angular position shown in FIG. 1b until the article 13 has been restarted by the air jets and propelled underneath both of the arms 23 and 25 in its continuing travel down the conveyor. When the article has completely past by the decelerator legs, the upwardly inclined jets of air acting on the turnstile legs again rotate the turnstile to its normal position of FIG. 1 or FIG. 1a, with one leg being disposed vertically facing downward in an intercept position with any further articles traveling the conveyor and with the other two legs positioned upwardly as shown. When the turnstile is again so positioned, the spring arm 18 engages the next tooth of the ratchet wheel 17 to stabilize or maintain the turnstile in this normal angular position.

Figure 2:
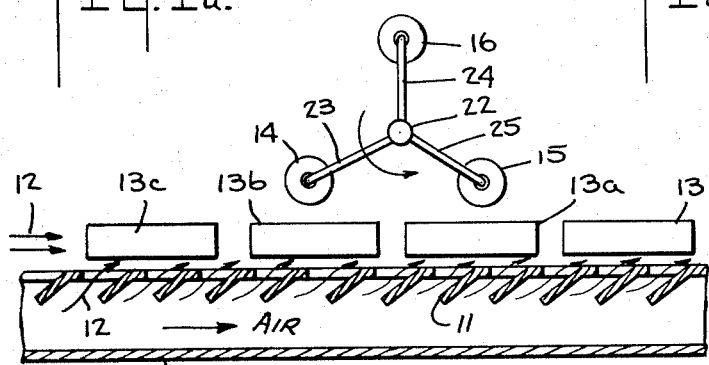
FIG. 2 is a side view schematically illustrating the passage of an accumulated group of articles without further interference by the decelerator.

It will be observed that each article traveling alone down the conveyor will be momentarily decelerated as described above by each of the plurality of spaced decelerators, which are spaced apart at distances corresponding to the maximum speed that is desired that the article reach in its travel. However, in the event that an accumulated group of such articles 13 are traveling in back-to-back engagement along the conveyor, or are traveling closely spaced apart from one another as shown by units 13c, 13 b, and 13a in FIG. 2, each of the decelerators operates only upon the first one of the accumulated group of articles, momentarily slowing the entire group that are in contact, and then allowing the entire group to pass by without further interference. This results from the fact that after completing the impact with the first article 13 of the group, the legs, 23 and 25 (in FIG. 1b) of the turnstile are in the displaced position shown above the article and out of contact with the article 13. The air jets emanating from the conveyor 12 are substantially blocked by the remaining accumulation of articles 13 from reaching the turnstile, and therefore cannot re-center the turnstile to its normal intercept position of FIG. 1 or FIG. 1a until all of the articles of the accumulated group have past by. This is, of course, the desired functional mode-of-operation of the decelerator since otherwise if a decelerating force was applied to each article of an accumulated group it could create a complete stoppage of the flow of the articles along the conveyor. Thus, the preferred decelerator provides a discriminating mode-of-operation that serves to regulate the speed of articles traveling alone down the conveyor while at the same time does not overregulate and completly stop and clog up an accumulation of articles being conveyed.

As will be appreciated by those skilled in the art the construction of the decelerator mechanism may be varied while performing the same function. For example, it is not required that three legs be provided since for any single decelerating action, only two legs are needed for impact with the front side and top of the article. Additionally, other forms of temporary stops or restraining devices may be employed for insuring that a downwardly facing decelerator leg is repositioned after each cycle of operation in readiness to impact with the next oncoming article along the conveyor. Since these and many other changes may be made by those skilled in the art without departing from the spirit and scope of this invention, this invention is to be considered as being limited only by the following claims.

What is claimed is:

1. An air conveyor comprising the combination of a conveyor surface having perforations therein, means for supplying a flow of air through said perforations to lift and move articles along said conveyor; and a momentum decelerator comprising a turnstile member having a plurality of legs extending therefrom, said turnstile member being mounted for rotational movement above the conveyor surface so that the depending legs may contact and decelerate articles moving along the conveyor, said turnstile member being rotated by air flowing through said perforations, and means for stopping the turnstile member from further rotation under the influence of said flowing air when a depending leg is rotated to a position in the path of articles moving along the conveyor.

2. An air conveyor comprising the combination of a conveyor surface having perforations therein, means for supplying a flow of air through said perforations to lift and move articles along said conveyor; and a momentum decelerator comprising a turnstile member having a plurality of legs extending therefrom, said turnstile member being mounted for rotational movement above the conveyor surface so that the depending legs may contact and decelerate articles moving along the conveyor, said depending legs being spaced from each other so that when a moving article on the conveyor contacts and rotates the turnstile member, a following leg on the rotating turnstile member contacts said moving article causing further deceleration of the article on the conveyor, said turnstile member being rotated by air flowing through said perforations, and means for stopping the turnstile member from further rotation under the influence of said flowing air when a depending leg is rotated to a position in the path of articles moving along the conveyor.

* * * * *